UNITED STATES PATENT OFFICE.

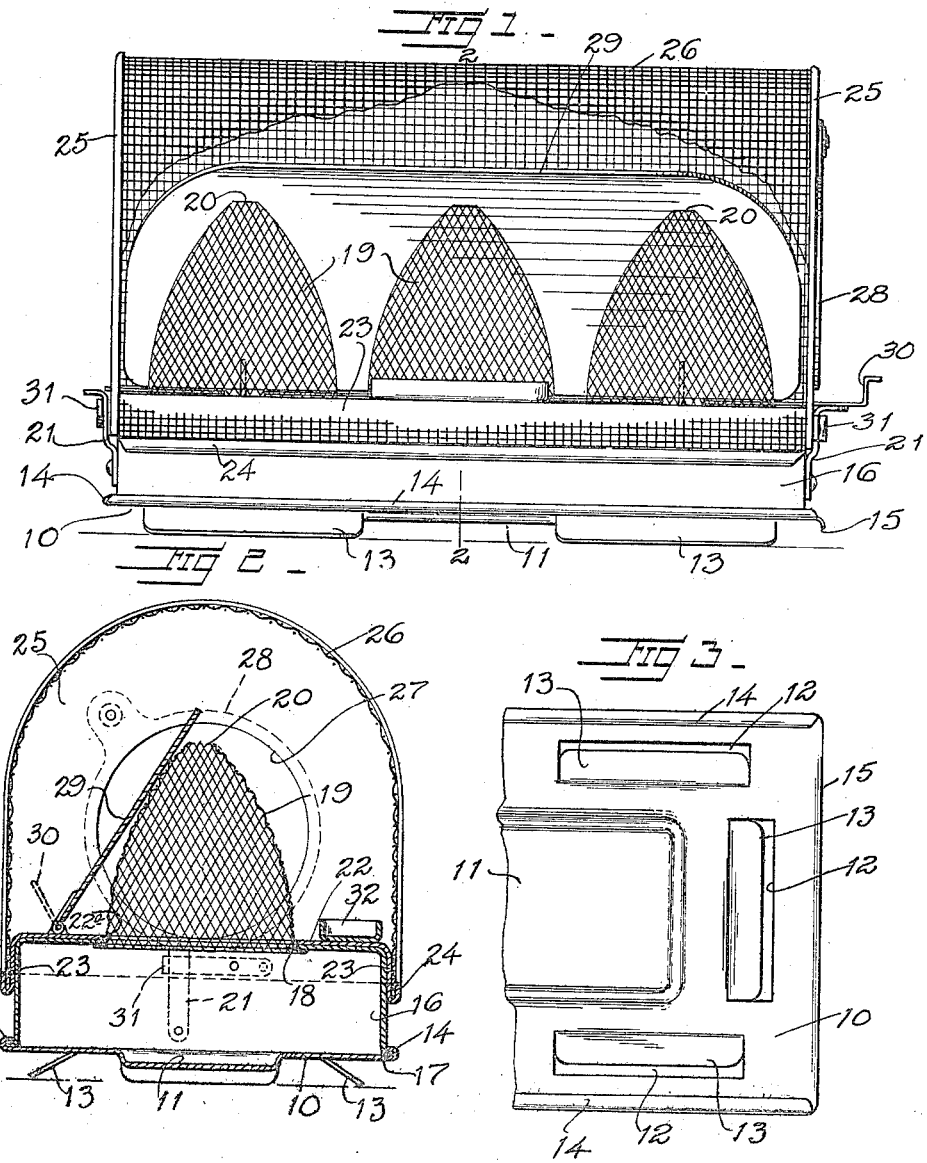

ERNEST E. ALLEN, OF EUGENE, OREGON.

FLY-TRAP.

1,277,527.  Specification of Letters Patent.  Patented Sept. 3, 1918.

Application filed June 19, 1918. Serial No. 240,767.

*To all whom it may concern:*

Be it known that I, ERNEST E. ALLEN, a citizen of the United States, residing at Eugene, in the county of Lane and State of Oregon, have invented certain new and useful Improvements in Fly-Traps, of which the following is a specification, reference being had to the accompanying drawings.

This invention relates to trapping devices, and particularly to traps for flies or other insects.

The general object is to provide a trap for this purpose which is of very simple construction, easily made, and very effective in use and which comprises a base plate having inlet openings, an intermediate chamber supplied with bait and the trap proper having a plurality of guarded entrance openings leading from the bait chamber, the parts being so formed that they may be readily disassembled or assembled.

A further object is to provide a device of this character in which the trap chamber may be disengaged from the bait chamber, without shifting the bait chamber at all or disarranging it, and thus without disturbing any flies which may be in the bait chamber.

Other objects will appear in the course of the following description.

My invention is illustrated in the accompanying drawings, wherein:

Figure 1 is a side elevation of my improved fly trap with the side wall partly broken away;

Fig. 2 is a transverse section; and

Fig. 3 is a fragmentary top plan view of the base plate.

Referring to these drawings, 10 designates the base plate which is preferably made of sheet metal and at its center is depressed as at 11 to form a receptacle for bait, such as syrup, sugar, etc. This plate 10 is formed with a plurality of preferably rectangular perforations 12 formed by slitting the metal around three sides of the proposed perforation and forcing the tongue 13 downward so as to form a foot or support. The plate is thus supported above the level of the article on which it is placed and these inclined portions 13 provide for guiding the fly or other insect up into the bait chamber. One end of the bait plate 10 and two sides of the plate are formed with overturned flanges 14 while the opposite end of the plate has a downwardly turned flange 15.

Coacting with the plate 10 and having sliding engagement therewith is a casing 16 having a top wall and end and side walls. The side walls are formed with laterally extending flanges 17 which engage beneath the lateral flanges 14 and one end wall of the chamber is formed with a flange engaging beneath the end flange 14 of the plate 10. The top of the casing 16 is formed with a plurality of openings shown as three in number and designated 18, and extending up from these openings are the three wire gauze guards 19, which have openings 20 at their upper ends, these guards being preferably somewhat conical. The end walls of the casing 16 are provided with pivoted latches 21.

The trapping chamber comprises a metallic plate 22 having an elongated opening $22^a$ in its bottom. At the sides this plate is bent downward as at 23 and the lower margins of these downwardly bent sides are upwardly turned as at 24. Imperforate end members 25 are attached to the plate 22, and wire gauze 26 is attached to these end members and arches over the plate 22 and extends down and has its edges clamped by the upturned flanges 24. The end plates 25 have their margins bent over upon the wire gauze and soldered or otherwise attached thereto. One of the end members 25 is formed with a discharge opening 27 normally closed by a pivoted door 28 and hinged upon the upper face of the plate 22 is a door 29 which closes the opening 22 when the trap section is removed from the casing 16, but which is normally held open, as illustrated in Fig. 2. This door may either fall of its own weight or the pintle of the door may be extended through one of the end sections and provided with a handle whereby it may be turned down as at 30. Attached to the end members 25 are the keepers 31 for the latches 21 and attached to the plate 22 on one side of the opening $22^a$ is a receptacle 32 designed to contain poison.

In the practical use of this device the depression 11 of the tray or plate 10 is filled with bait. This tray or plate 10 may then be slid into engagement with the casing 16 and thus a bait chamber is provided. The trap section is then disposed over the casing 16 and is locked thereto by means of the latches 21 engaging with the keepers 31. Flies or other insects will enter through the openings 12 attracted by the bait and inasmuch as the trap section is relatively light, the flies will climb up the conical guards 19 and pass out through the openings 20 into the trap section. They will then eat of the poison in the receptacle 32 and die. When it is desired to remove the flies it is not necessary to remove the whole device but only to release the catches 21 and lift the trap section from the casing. At the same time the door 29 will close so as to close the opening 22ª, then the flies may be discharged through the opening 27. The trap section may then be replaced upon the base. The object in providing a plurality of conical shields or guards 19 is that where only one guard is used, a fly will often get near the hole in the apex of the guard and while not going through this hole himself will keep other flies back for a space of time. By providing a plurality of these guarded openings, there will always be one or more open entrances to the interior of the trap. The device is simple and may be cheaply made and it is obvious, of course, that it may be made of any desired dimensions and of any number of openings 18 and conical shields therefor.

What I claim is:

1. A fly trap comprising a base plate having openings and feet supporting the base plate, a section having side walls slidingly engaging with the base plate and having openings in its upper wall, wire gauze guards extending up from said openings, and a trapping section proper detachably engageable with said casing and having a bottom formed with an opening through which said guards project, and a door normally open but adapted to close said opening.

2. A trap of the character described comprising a base plate formed with a central depression adapted to contain bait and having a plurality of openings arranged around the depression and formed with downwardly extending feet supporting the base plate, a casing having sliding detachable engagement with the base plate and having a top wall provided with a plurality of openings, approximately conical wire gauze guards extending upward from said openings and each having an opening at its apex, and a trapping section proper engageable over the casing, supported thereon, and having end walls, and a wire gauze body, one of the end walls having a discharge opening and a door normally closing it, the bottom of the trapping section having an opening through which the wire gauze guards project, and a door adapted to close said opening but normally held open by the guards, the casing and trap section being formed with coacting latches and keepers.

3. A trap of the character described comprising a base plate having a plurality of rectangular openings and tongues cut out from said openings and forced downward and formed with feet, the side edges of the plate being bent over to form guides, and a casing forming part of the base and having side and end walls, the side walls having laterally extending flanges engageable with the guides on the base, the casing having a top wall formed with a plurality of openings and having conical wire gauze guards extending up through the openings and having openings at their upper ends, the end walls of the casing having latches, and a trap body comprising a bottom formed of a bottom plate having downward extending sides, imperforate end walls, and wire gauze attached to said end walls arching over the bottom and having their margins engaged by flanges on the downwardly extending sides, one of the end walls being formed with a discharge opening, keepers on said end walls engageable with the latches, the bottom wall of the trap having an elongated opening to receive a plurality of conical guards, and a door closing said opening.

In testimony whereof I hereunto affix my signature in the presence of two witnesses.

ERNEST E. ALLEN.

Witnesses:
CHARLES M. STEVENS,
JOHN W. ALLEN.